April 30, 1968   F. J. DOUGHERTY ET AL   3,380,884
1,2-EPOXYALKANE VOLATILE RESIDUAL SPACE FUNGICIDES
ADSORBED IN PELLETED MOLECULAR SIEVES
Filed Oct. 31, 1966
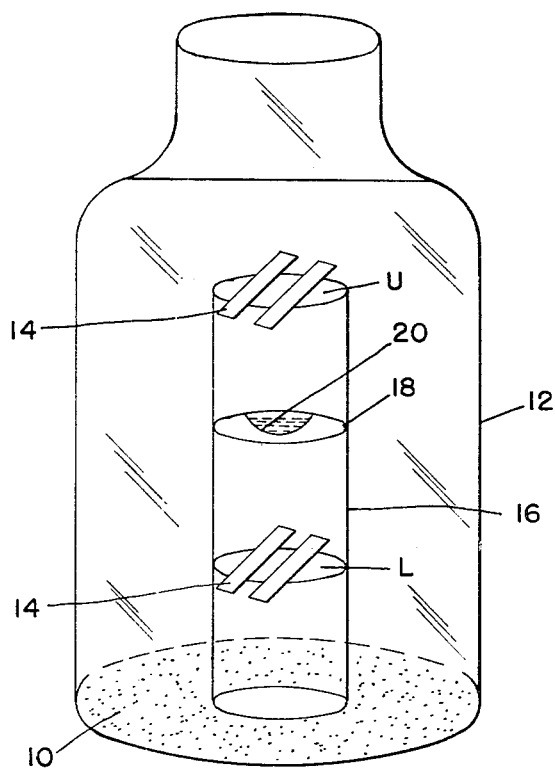
INVENTOR.
SIDNEY H. ROSS
FRANCIS J. DOUGHERTY
BY: Harry M. Saragovitz,
Edward J. Kelly,
Herbert Berl &
S. Dubroff   ATTORNEYS:

United States Patent Office 3,380,884
Patented Apr. 30, 1968

3,380,884
1,2-EPOXYALKANE VOLATILE RESIDUAL SPACE FUNGICIDES ADSORBED IN PELLETED MOLECULAR SIEVES
Francis J. Dougherty, Churchville, and Sidney H. Ross, Philadelphia, Pa., assignors to the United States of America as represented by the Secretary of the Army
Continuation-in-part of application Ser. No. 370,743, May 27, 1964. This application Oct. 31, 1966, Ser. No. 600,316
4 Claims. (Cl. 167—39)

This invention is a continuation-in-part of our co-pending patent application, Ser. No. 370,743, filed May 27, 1964, assigned to the same assignee hereof, now abandoned, and relates to residual space control of microorganisms on various materials and more particularly concerns new compositions of matter for permitting the slow and sustained release of fungicidal agents without the need of mechanical means therefor.

Ethylene oxide gas is a widely used sterlizing agent which possesses a remarkable fungicidal effect. It is particularly suitable in those applications where deep penetration into porous materials or narrow crevices is desired. Additionally, the use of ethylene oxide is further enhanced by its ability to be tolerated by an almost endless variety of materials. Other advantages resulting from the use of ethylene oxide are its efficacy at room temperature, its effectiveness at low humidity, its fungicidal rather than fungistatic qualities, and its deep penetration properties.

Pure ethylene oxide gas is flammable and capable of being easily ignited when mixed with proper proportions of air or oxygen. Ethylene oxide is capable of use at 100% concentration for sterilization purpose, but very specialized and costly equipment is required. By diluting the ethylene oxide with inert gasses, its flammability characteristics can be reduced or wholly eliminated. Mixtures containing 88% by weight dichlorodifluoremethane and 12% ethylene oxide by weight are known to be not flammable. Although this mixture is safe to handle, when adsorbed on a molecular capable of absorbing the mixture, the resultant product will contain only about 2% of ethylene oxide, as the active ingredient.

A molecular sieve of synthetic crystalline metal alumino-silicates belonging to a class of minerals known as zeolites has the ability to undergo dehydration with little or no change in their crystal structure. The dehydrated crystals are honey-combed with regularly spaced cavities interlaced by channels of molecular dimensions. This network of uniform pores and cavities comprises almost 50% of the total volume of the crystals. The empty cavities in these dehydrated or activated molecular sieves have a strong tendency to recapture the water molecules that have been driven off. If no water is present, they will accept any molecules that are small enough to pass through the pores into the adsorption cavity. When zeolites as above-described, having a pore diameter of about 5 to 13 angstroms (capable of adsorbing difluorodichloromethane) were attempted to be loaded with pure ethylene oxide, the powdered sieve material turned cherry red in color within about 5 seconds and exploded. When zeolites as above-described were loaded with a mixture of 88% by weight difluorodichlormethane (Freon-12) and 12% by weight ethylene oxide we have found that approximately 16% to 18% of the mixture may be sorbed onto the sieve, or the sieve contained about only 2% ethylene oxide as the effective ingredient.

It would be most advantageous if a device were made available which would be capable of containing effective ethylene oxide in concentrations substantially greater than about 2%, requiring no mechanical valves or hermetic seals, and yet being without danger in its preparation.

It is therefore an object of this invention to provide a product capable of releasing fugicidal vapors over extended periods.

A further object of the invention is to provide an inexpensive nonflammable product capable of safely releasing fungicidal vapors and requiring no mechanical valves or hermetic seals.

Still another object of the invention is to provide such a product as above-described wherein about 16%–18% effective ethylene oxide is loaded within said product.

The exact nature of this invention as well as other objects and advantages thereof will be readily apparent from consideration of the following specifications.

In practicing our invention, about 80 grams of molecular sieve powder having a pore diameter of about 5 to 13 angstroms are weighed into a shallow dish. The sieve powder is mixed thoroughly with about 20 grams of a clay, typically kaolin, china or ball clay, although not limited thereto, having a particle size of about 1 to 5 microns. A sufficient quantity of water is added to the mixture to permit extrusion thereof. The extruded mass is then formed into pellets by means well known. The pellets are then dried at a temperature of about 1100° F.

We have discovered that pellets having a diameter of about ⅛ inch and a length about ¼ to ⅜ inch long work admirably well. It will be understood that pellets, or slugs, or discs, and the like, having dimensions varying from the above are contemplated by this invention.

A typical method for safely adsorbing pure ethylene oxide onto pellets of molecular sieve (zeolite type) is as follows:

About 25 grams of ethylene oxide was condensed in a flask which was immersed in a Dry Ice-acetone mixture. The condensed liquid was then placed under the perforated shelf of a typical vacuum desiccator while the dry activated pellets were placed on top of the shelf. The desiccator was evacuated initially to a pressure of about 10 millimeters of mercury and the pellets allowed to adsorb the vaporizing ethylene oxide. After about two hours, the desiccator was permitted to return to atmospheric pressure and the pellets removed from the desiccator and weighed in order to determine the percentage adsorption. About 16%–18% by weight of pure ethylene oxide oxide could be located into the pellets when our above process is followed.

Using the procedures generally outlined above, the mixture of Freon-12, 88% by weight, and ethylene oxide, 12% by weight, was safely adsorbed onto molecular sieve powder (5–13 angstroms in pore size), or onto molecular sieve pellets as aforedescribed. Our loaded pellets and molecular sieve powders were then evaluated for inhibition of fungus growth in accordance with the following—

Test No. 1: Plain control (no pellets or molecular sieves involved, only the plain test substrates, i.e., cellophane previously dipped in malt broth).

Test No. 2: Plain pellets and molecular sieve (unloaded).

Test No. 3: 8.1 grams of loaded molecular sieve containing only Freon-12, about 16%–18% adsorption.

Test No. 4: 8.1 grams of loaded molecular sieve containing a mixture of 88% by weight Freon-12 and 12% by weight ethylene oxide (about 16%–18% adsorption).

Test No. 5: 4.07 grams of loaded molecular sieve containing a mixture of 88% by weight of Freon-12 and 12% by weight of ethylene oxide (about 16%–18% adsorption).

Test No. 6: 1.63 grams of loaded molecular sieve containing a mixture of 88% by weight of Freon-12 and 12% by weight of ethylene oxide (about 16%–18% adsorption).

Test No. 7: 1.63 grams of loaded molecular sieve pellets (kaolin binder) containing pure ethylene oxide (about 16%–18% adsorption).

Test No. 8: 0.25 gram of loaded molecular sieve pellets (china clay binder) containing pure ethylene oxide (about 16%–18% adsorption).

Referring now to the single drawing which illustrates a typical set-up for testing the biocidal effectiveness of our inventive product, each of the molecular sieves 10 (Tests No. 2 thru 6), in accordance with the weights above-mentioned, was spread uniformly across the bottoms of different one quart capacity Mason jars 12 to provide maximum surface area. In the case of Tests No. 7 and 8, loaded pellets were placed on the bottom of the jar. Cellophane substrates 14 were placed at two different levels, a lower level L, and an upper level U, of a stainless steel rack 16 contained within the jar. The cellophane was backed with filter paper which had been soaked about fifteen minutes in malt broth and allowed to dry. The cellophane strips were then streaked with *Aspergillus niger* spores, American Type Culture Collection No. 6275. At a level 18 intermediate to the substrate levels was placed a small dish 20 containing about 10 milliliters of water since humidity is required for spore germination and for the release of vapors of pure ethylene oxide, or the Freon-12-ethylene oxide mixture trapped within the molecular sieve or, in the case of the pellets, the pure ethylene oxide trapped therewithin. All jars were then sealed with aluminum foil and the usual rubber gasket and glass lid, and incubated at 86° F. for varying periods:

TABLE I.—RESUTLTS OF FUNGUS SPORE GERMINATION TEST

| Test No. | Level | Percent Spore Germination (hrs.) | | |
|---|---|---|---|---|
| | | 18 | 66 | 138 |
| 1 | Upper | 100 | 100 | 100 |
| | Lower | 95 | 100 | 100 |
| 2 | Upper | 40 | 95 | 100 |
| | Lower | 0 | 75 | 100 |
| 3 | Upper | 95 | 95 | 100 |
| | Lower | 1 | 95 | 100 |
| 4 | Upper | 0 | 0 | 0 |
| | Lower | 0 | 0 | 0 |
| 5 | Upper | 0 | 0 | 0 |
| | Lower | 0 | 0 | 0 |
| 6 | Upper | 95 | 95 | 100 |
| | Lower | 1 | 95 | 100 |
| 7 | Upper | 0 | 0 | 0 |
| | Lower | 0 | 0 | 0 |
| 8 | Upper | 0 | 0 | 0 |
| | Lower | 0 | 0 | 0 |

It is apparent from the data tabulated above that fungus spore germination was inhibited by the presence of about 4 to 8 grams of chemically loaded molecular sieves contained in a one quart jar, or .25 to 1.63 grams of loaded pellets. Adsorbed on the powdered sieve was a mixture of 88% Freon-12 and 12% ethylene oxide, at a concentration of about 16% by weight of the loaded sieve, or about 2% effective ethylene oxide. By using 100% ethylene oxide (adsorbed in pellets), fungicidal effectiveness was increased by about eight fold.

Fungicidal effectiveness of vapors of ethylene oxide released from pelleted molecular sieves (zeolite) was determined after ten month exposure test in the rain forest, Ft. Sherman, C. Z. The pelleted sieve was loaded with ethylene oxide until it had adsorbed approximately 16–18 percent of its weight. Also, the effect of propylene glycol coatings on the prolongation of fungicidal properties was determined. The test systems used consisted of two-quart capacity aluminum cans, with loose fitting lids, containing fungus susceptible substrates; namely, cork, leather, cellophone, and vinyl plastic film. The molecular sieve used was type 13X. Observations of the test substrate after a ten month exposure, protected from direct rain by a roof, are tabulated below:

TABLE II.—FUNGICIDAL EFFECTIVENESS OF VAPORS OF ETHYLENE OXIDE RELEASED FROM MOLECULAR SIEVES AFTER TEN MONTHS TEST IN RAIN FOREST. FT. SHERMAN, CANAL ZONE—EXTENT OF FUNGUS GROWTH ON TEST SUBSTRATES IN CANS.

| Type and amount of solid agent added to can | Leather | Cork | Cellophane | Plastic |
|---|---|---|---|---|
| None (control) | 5 | 1 | 3 | 2 |
| Control, 5 g. mol. sieve | 4 | 1 | 4 | 1 |
| Control, 40 g. mol. sieve | 5 | 5 | 5 | 4 |
| 5 g. pelleted mol. sieve w/adsorbed ethylene oxide | 5 | 5 | 4 | 1 |
| 40 g. pelleted mol. sieve with adsorbed ethylene oxide | 0 | 0 | 0 | 0 |
| Ethylene oxide loaded molecular sieve coated (20% by weight) with propylene glycol: [3] | | | | |
| 5 grams | 4 | 1 | 1 | 0 |
| 10 grams | 5 | 1 | 0 | 0 |
| 20 grams | 0 | 0 | 0 | 0 |

[1] Mold growth observations are presented on a 0 to 5 scale wherein 0 designates no growth and 5 designates growth which completely covered substrates.
[2] In all cases, ethylene oxide adsorbed was 16–18% by weight of the sieve material and was of 5 to 13 angstroms in pore diameter.
[3] Propylene glycol comprised about 20% of the weight of pelleted sieve material and ethylene oxide.

Fungical effectiveness of ethylene oxide released from our pelleted molecular sieves (5–13 angstroms pore diameter) was also determined in a 1 year Laboratory-Tropical Chamber. The vessels were 2-quart aluminum cans with loose lids permitting ingress of moisture from the tropical chamber and egress of vapor. The substrates employed were cork, leather, cellophane, and vinyl plastic. In all cases the percentage by weight of ethylene oxide adsorbed onto the pelleted sieves was about 16–18.

TABLE III.—FUNGICIDAL EFFECTIVENESS OF VAPORS OF ETHYLENE OXIDE RELEASED FROM PELLETED MOLECULAR SIEVES. 1 YEAR LABORATORY—TROPICAL CHAMBER

| Type and amount of solid agent added to vessel: | Length of time substrates were free from mold growth, mos. |
|---|---|
| Fumigated only with ethylene oxide vapor | <6 |
| 40 grams plain molecular sieve | <6 |
| 5 grams ethylene oxide loaded pelleted molecular sieve and paraffin coated | <6 |
| 40 grams ethylene oxide loaded pelleted molecular sieve and paraffin coated | >8<12 |
| 5 grams ethylene oxide loaded pelleted molecular sieve, uncoated | >8<12 |
| 40 grams ethylene oxide loaded pelleted molecular sieve, uncoated | >8<12 |
| 40 grams, ethylene oxide loaded pelleted molecular sieve, propylene glycol coated (20% by weight) | >12 |

It is apparent from the above that the pelleted molecular sieves containing about 40 grams ethylene oxide which were coated with propylene glycol (about 20% by weight of the loaded pellets) were the most effective in preventing any mold growth on the substrates tested.

Obviously many modifications and variations of the present invention are possible in the light of the above teachings. For example, the ethylene oxide loaded molecular sieve, in either pure or diluted form or the loaded pellets, may be coated in order that release of fungicidal vapors be further extended when the sieve or pellets are exposed to high relative humidities. A typical wax coating may be microcrystalline or paraffin, for example, while liquid coatings may suitably be mineral oils, silicones, etc. We have also found that diols, especially propylene glycol (1,2-propanediol) to work admirably well. Further, our loaded devices may be placed in plastic bags of polyolefinic materials, polyester materials or of polyflurohydrocarbons, for example, and then placed in various instruments needing the fungistatic protection offered by our product.

Nor is our invention limited only to ethylene oxide. Other higher homologous alkylene oxides ranging up to and including eight carbon atoms have been loaded successfully into molecular sieves and pellets. For example, five grams of molecular sieve, powdered and pelleted, loaded with butylene-oxide in accordance with our process above described (about 16%–18% adsorption) were placed in one-quart metal can containing fungus susceptible test substrates such as cotton cloth, leather and vinyl plastic, the container having a loose fitting cover to permit leakage of our fungicidal vapors. After exposure for one year at the United States Navy Research Laboratories, Tropical Exposure Site, Gaeita, Canal Zone, in a typical rain forest jungle area, the controls containing test substrates above developed heavy fungus growth, whereas those containing our loaded sieves were completely free of growth whatsoever. Similarly, equally satisfactory results were obtained when 10 g. of molecular sieve, powdered or pelleted, were loaded with octylene oxide at 16%–18% adsorption was tested.

However, when 1,2-epoxynonane was evaluated, its vapor pressure was found to be too low and the compound insufficiently volatile to provide satisfactory fungicial action.

It is apparent from the foregoing description that we have provided new and useful biocidal devices finding wide application in the preservation of electrical and electronic equipment, optical devices and various packaged items wherein the contents thereof must be protected against damaging bacteria and fungus growth under temperature and humidity conditions favorable for such growth and wherein any use of contact fungicides or coatings would be highly undesirable.

We claim:

1. A volatile residual space fungicide for effectively destroying micro-organisms over an extended period and comprising
   a pelleted molecular sieve having 1,2-epoxybutane completely adsorbed therewithin in an amount of about 16 to 18% by weight of said pelleted molecular sieve.
2. A volatile residual space fungicide for effectively destroying micro-organisms over an extended period and comprising
   a pelleted molecular sieve having a 1,2-epoxyalkane of pletely adsorbed therewithin in an amount of about 16 to 18% by weight of said pelleted molecular sieve.
3. A volatile residual space fungicide for effectively destroying micro-organisms over an extended period and comprising
   a pelleted molecular sieve having an 1,2-epoxyalkane of from 4 to 8 carbon atoms completely adsorbed therewithin in an amount of about 16 to 18% by weight of said pelleted molecular sieve.
4. A volatile residual space fungicide for effectively destroying micro-organisms over an extended period and comprising
   a pelleted molecular sieve having 1,2-epoxyethane completely adsorbed therewithin in an amount of about 16 to 18% by weight of said pelleted molecular sieve, said fungicide being coated with propylene glycol in an amount of about 20% of the total weight of the loaded pellets.

References Cited

UNITED STATES PATENTS

| | | | |
|---|---|---|---|
| 2,075,845 | 4/1937 | Gross et al. | 167—39 |
| 2,101,587 | 12/1937 | Levine et al. | 167—22 |
| 2,413,405 | 12/1946 | Campbell et al. | 167—39 |
| 2,891,838 | 6/1959 | Kaye | 21—58 |
| 2,954,935 | 10/1960 | Stearns et al. | 239—373 |
| 2,965,936 | 12/1960 | Kaye | 21—91 |
| 2,988,284 | 6/1961 | Smith | 239—54 |
| 3,081,223 | 3/1963 | Gunning et al. | 167—39 |
| 3,163,494 | 12/1964 | Kaye | 21—58 |
| 3,234,028 | 2/1966 | Dunham et al. | 99—103 |
| 3,250,680 | 5/1966 | Menkart et al. | 167—85 |

OTHER REFERENCES

Nikolina et al.: "Molecular Sieves-Preparation, Properties, and Applications," in Russian Chemical Reviews 29(9): 509–521 September 1960.

Grubner et al.: "Preparation and Properties of Molecular Sieves of the "A" Type" Chem. Abstracts 56: 2909ce Feb. 19, 1962.

LEWIS GOTTS, *Primary Examiner.*

S. K. ROSE, *Assistant Examiner.*